(12) United States Patent
Giarrizzo, Jr. et al.

(10) Patent No.: US 10,525,941 B2
(45) Date of Patent: Jan. 7, 2020

(54) SYSTEM AND PROCESS FOR COLLISION REPAIR OF MOTOR VEHICLES

(71) Applicant: DCR IP Company, LLC, Mentor, OH (US)

(72) Inventors: Michael Giarrizzo, Jr., Chagrin Falls, OH (US); Martin Gerard Roberts, Mentor, OH (US)

(73) Assignee: DCR IP Company, LLC, Mentor, OH (US)

( * ) Notice: Subject to any disclaimer, the term of this patent is extended or adjusted under 35 U.S.C. 154(b) by 113 days.

(21) Appl. No.: 15/838,084

(22) Filed: Dec. 11, 2017

(65) Prior Publication Data
US 2019/0176779 A1 Jun. 13, 2019

(51) Int. Cl.
*B60S 5/00* (2006.01)
*G06Q 10/00* (2012.01)
*B21D 1/00* (2006.01)

(52) U.S. Cl.
CPC ............. *B60S 5/00* (2013.01); *B21D 1/00* (2013.01); *G06Q 10/00* (2013.01)

(58) Field of Classification Search
CPC ........ B42D 5/001; B42D 5/002; B42D 5/022; B42D 5/028; B42D 15/0086; B42D 19/00; A63F 9/1044; B60S 5/00
USPC ....................................................... 206/338
See application file for complete search history.

(56) References Cited

U.S. PATENT DOCUMENTS

| | | | | |
|---|---|---|---|---|
| 1,462,683 A | * | 7/1923 | Bush | B42D 5/002 281/44 |
| 2,312,331 A | * | 3/1943 | Freedman | B41L 1/24 462/71 |
| 2,367,773 A | * | 1/1945 | Haveles | B42D 5/006 83/560 |
| 2,612,708 A | * | 10/1952 | Amsel | A63F 9/10 434/340 |
| 4,136,480 A | * | 1/1979 | Fabricant | A63F 9/10 273/157 R |
| 4,142,726 A | * | 3/1979 | Anderson | A63F 9/1044 273/157 R |
| 4,486,018 A | * | 12/1984 | Keller, Jr. | A63F 9/1044 206/315.1 |
| 4,487,585 A | * | 12/1984 | Goldwasser | A63F 9/10 273/156 |

(Continued)

Primary Examiner — Ernesto A Grano
(74) Attorney, Agent, or Firm — Curatolo Sidoti Co LPA; Salvatore A. Sidoti

(57) ABSTRACT

A system and method for repairing collision damage or servicing a motor vehicle that involves managing and organizing a plurality of parts that have been removed from the motor vehicle during the repair or service process. The system includes a base member having opposite facing top and bottom surfaces and a plurality of regions corresponding to different sections of the body of a motor vehicle displayed on the top surface of the base member. An overlay member having opposite facing top and bottom surfaces and a plurality of open regions corresponding to the base regions is configured to be superimposed over the base member to create a plurality of separate compartments for locating and holding parts that have been removed from specific sections of the motor vehicle for later assembly back onto the vehicle in a downstream collision repair or service process step.

23 Claims, 6 Drawing Sheets

(56) References Cited

U.S. PATENT DOCUMENTS

| | | | | |
|---|---|---|---|---|
| 4,802,693 | A * | 2/1989 | Brown | B42D 19/00 |
| | | | | 281/11 |
| 4,811,951 | A * | 3/1989 | Dorsey-Zinn | A63F 9/001 |
| | | | | 273/157 R |
| 4,826,059 | A * | 5/1989 | Bosch | A45C 11/24 |
| | | | | 206/350 |
| 5,251,751 | A * | 10/1993 | Prussen | G09F 3/00 |
| | | | | 206/338 |
| 5,494,162 | A * | 2/1996 | Treace | A61F 2/0095 |
| | | | | 206/438 |
| 5,690,223 | A * | 11/1997 | Wood | A61L 2/26 |
| | | | | 206/363 |
| 5,979,895 | A * | 11/1999 | Dove | G09B 1/06 |
| | | | | 273/157 R |
| 6,145,676 | A * | 11/2000 | Gross | B25H 3/04 |
| | | | | 211/70.6 |
| 6,151,819 | A * | 11/2000 | Gorospe | B42D 19/00 |
| | | | | 40/352 |
| 6,276,525 | B1 * | 8/2001 | Kobeluch | A63F 9/1044 |
| | | | | 206/315.1 |
| 6,416,054 | B1 * | 7/2002 | Alfassi | A63F 9/1044 |
| | | | | 273/156 |
| 6,663,732 | B1 * | 12/2003 | Link | A63F 9/10 |
| | | | | 156/63 |
| 7,150,362 | B1 * | 12/2006 | Questiaux | B25H 3/04 |
| | | | | 211/70.6 |
| 7,380,664 | B2 * | 6/2008 | Suzuki | A47F 5/08 |
| | | | | 206/459.5 |
| 7,552,821 | B1 * | 6/2009 | Demers | A63F 9/1044 |
| | | | | 206/315.1 |
| 8,118,162 | B1 * | 2/2012 | McEwin | B25H 3/04 |
| | | | | 206/338 |
| 9,428,320 | B1 * | 8/2016 | Sutherland | B25H 3/06 |
| 9,776,773 | B1 * | 10/2017 | Chen | B65D 43/169 |
| 10,039,630 | B2 * | 8/2018 | Funk | A61F 2/0095 |
| 10,239,199 | B2 * | 3/2019 | Mathis | B25H 3/04 |
| 2001/0052670 | A1 * | 12/2001 | Clerc | A63F 9/10 |
| | | | | 273/157 R |
| 2006/0005412 | A1 * | 1/2006 | Frawley | A47G 9/0284 |
| | | | | 33/566 |
| 2010/0065456 | A1 * | 3/2010 | Junk | A61L 2/26 |
| | | | | 206/363 |
| 2012/0027965 | A1 * | 2/2012 | Wilen | A63F 9/1011 |
| | | | | 428/33 |
| 2013/0334093 | A1 * | 12/2013 | Mello | B44D 3/00 |
| | | | | 206/575 |
| 2014/0026521 | A1 * | 1/2014 | Beal | B65D 25/06 |
| | | | | 53/428 |
| 2015/0035231 | A1 * | 2/2015 | Dyrdahl | A63F 9/1044 |
| 2016/0121638 | A1 * | 5/2016 | Kelly | B26F 1/44 |
| | | | | 283/85 |
| 2018/0296910 | A1 * | 10/2018 | Chazen | A63F 9/1044 |

* cited by examiner

SYSTEM AND PROCESS FOR COLLISION REPAIR OF MOTOR VEHICLES

TECHNICAL FIELD

The present disclosure relates to a system and process for repairing vehicle collision damage. The present disclosure more particularly relates to a vehicle collision repair system and a process for repairing vehicle collision damage using the vehicle collision repair system.

BACKGROUND

The exterior bodies of vehicles are primarily manufactured from steel, other metal alloys, and composite materials. The materials from which the exterior bodies of vehicles are manufactured for the most part are not plastic materials. Thus, when a force is applied to the exterior body of a vehicle during a collision, the portion of the exterior body subjected to the force does not return to its original shape. To the contrary, exterior bodies of vehicles are usually permanently deflected in response to a force applied during the impact of a collision.

Depending on the extent of damage sustained by the vehicle during a collision, the vehicle may be a candidate for collision damage repair. There are about forty thousand vehicle collision repair facilities in the United States. It is estimated that in the United States, vehicle owners and insurance companies expend about twenty-six billion dollars on an annual basis for vehicle collision repair services.

Motor vehicles (automobiles, trucks, buses, etc.) therefore inevitably require maintenance, repairs, or some other service at some point during their useful life. The repair and maintenance of a motor vehicle often requires small parts to be removed and placed aside for later re-installation. During the repair or service process, it is necessary for a mechanic or technician to effectively manage a plurality of parts and components removed from the motor vehicle to ensure that no parts are lost, and also for efficient re-installation.

Efficient management of the disassembly/assembly process for motor vehicles can be a daunting task for a mechanic. This problem is exacerbated when multiple mechanics are servicing the same vehicle. For example, one mechanic may not have a clear understanding of the location of a part(s) that was previously removed from the vehicle by another mechanic, and how the part(s) should be reinstalled. Additionally, during disassembly and reassembly of a motor vehicle, the small parts can be easily misplaced by the one or multiple mechanics servicing the vehicle.

Confusion between mechanics, misplaced parts, and mistakes made during automotive servicing can increase the time to repair or service a vehicle, thus significantly decreasing the efficiency of an automotive shop and increase the overall cost to the shop owner. There is a need in the industry for a system and process for effectively managing and organizing parts during a vehicle repair or service operation that can assist in the efficient disassembly and reassembly of a vehicle.

SUMMARY

Disclosed is a system for managing and organizing parts, the system comprising a base member comprising opposite facing top and bottom surfaces and a plurality of regions corresponding to different sections of the body of a motor vehicle displayed on said top surface of said base member; and an overlay member comprising opposite facing top and bottom surfaces and a plurality of open regions corresponding to the base regions.

Additionally disclosed is a kit for managing and organizing a plurality of parts removed from a motor vehicle comprising a base member comprising opposite facing top and bottom surfaces and a plurality of regions corresponding to different sections of the body of a motor vehicle displayed on said top surface of said base member; an overlay member comprising opposite facing top and bottom surfaces and a plurality of open regions corresponding to the base regions; an elongated support member; and a plurality of parts carriers configured to hold loose parts and to engage said support.

Further disclosed is a method of repairing collision damage or servicing a motor vehicle comprising (i) removing parts from said motor vehicle, (ii) placing said removed parts in one or more compartments of a system which correspond to a section of the motor vehicle from which the part was removed, wherein said system comprises (a) a base member comprising opposite facing top and bottom surfaces and a plurality of regions corresponding to different sections of the body of a motor vehicle displayed on said top surface of said base member, and (b) an overlay member comprising opposite facing top and bottom surfaces and a plurality of open regions corresponding to the base regions, wherein said overlay member is positioned on said top surface of said base member and said openings of said overlay member are substantially superimposed over said corresponding base regions member of said base to form said one or more compartments, (iii) transferring said removed parts from said compartments to parts carriers corresponding to said compartments, (iv) performing at least one collision repair or service task on said motor vehicle; and (v) reinstalling sad removed parts to said section of said motor vehicle from which they were removed.

BRIEF DESCRIPTION OF THE DRAWINGS

The following is a brief description of the drawings. The drawings are presented for the purpose of further describing certain illustrative embodiments of the system and process disclosed herein. The illustrative drawings should not be construed as limiting the presently disclosed system or process in any manner whatsoever.

FIG. 3 also shows removed parts that have been transferred from certain regions to parts bags.

DETAILED DESCRIPTION

Figure 1:
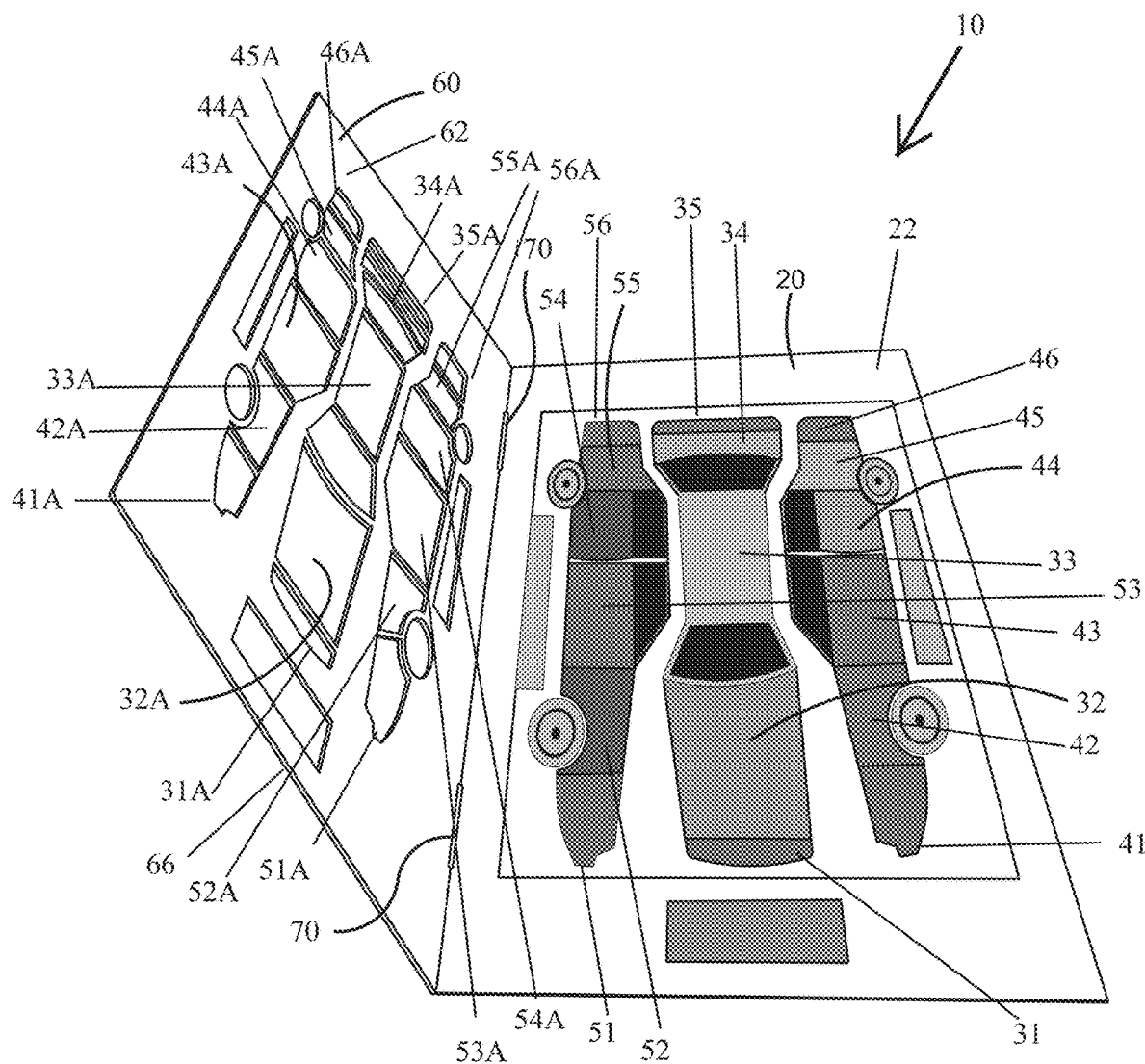
FIG. 1 is a top perspective view of an illustrative embodiment of the vehicle repair or service system in an open position showing the base member hingedly attached to an overlay member.

The following text sets forth a broad description of numerous different and illustrative embodiments of the present disclosure. The description is to be construed as exemplary only and is not intended to describe each and every possible embodiment of the subject matter since describing every possible embodiment would be impractical, if not impossible. It will be understood that any feature, characteristic, component, composition, ingredient, product, step, or methodology described herein can be deleted, combined with, or substituted for, in whole or part, any other feature, characteristic, component, composition, ingredient, product, step or methodology described herein.

The terms "comprises," "comprising," "has," "having," "includes," "including," "contains," "containing," or any other variation are open-ended and are intended to cover a non-exclusive inclusion of elements, such that an article, apparatus, compound, composition, combination, method, or process that "comprises," "has," or "includes," or "contains" a recited list of elements does not include only those elements but may include other elements not expressly listed, recited or written in the specification or claims. An element or feature proceeded by the language "comprises . . . a," "contains . . . a," "has . . . a," or "includes . . . a" does not, without more constraints, preclude the existence or inclusion of additional elements or features in the article, apparatus, compound, composition, combination, method, or process that comprises, contains, has, or includes the element or feature.

The terms "a" and "an" are defined as one or more unless expressly stated otherwise or constrained by other language herein. An element or feature proceeded by "a" or "an" may be interpreted as one of the recited element or feature, or more than one of the element or feature.

The present disclosure broadly relates to a system for managing and organizing a plurality of parts that are disassembled or otherwise removed from a motor vehicle during a collision damage repair process or other routine service. The removed parts are located in designated regions of the system that correspond to the section of the vehicle from which they were removed. The removed parts are held in the designated regions of the system and then reinstalled onto the motor vehicle during a downstream step of the collision repair or service process. The system is configured for use in connection with a motor vehicle collision repair process, a maintenance process or a service process. The system includes a base member that comprises opposite facing top and bottom surfaces. The opposite facing surfaces of the base member of the system may also be referred to as opposite facing first and second surfaces.

The base member further includes a plurality of distinct regions corresponding to different sections of the body of a motor vehicle displayed on the top surface of the base member. Without limitation, and only by way of illustration, the designated regions displayed on the top surface of the base member of the system correspond to the front bumper, hood, roof of passenger cabin, trunk, rear bumper, driver's side front side panel, driver's side front door, driver's side rear door, driver's side rear panel, passenger side front side panel, passenger side front door, passenger side rear door, and passenger side read panel and rear bumper of the exterior body of a motor vehicle. Various combinations of one or more sections of the exterior body of a motor vehicle may be displayed on the top surface of the base member. It should be noted that not all of the above sections of the exterior body of the motor vehicle must be displayed on the top surface of the base member.

The system includes a second overlay member that is configured to be positioned on the top surface of the base member. The second overlay member comprises opposite facing top and bottom surfaces. The opposite facing surfaces of the overlay member of the system may also be referred to as opposite facing first and second surfaces. The overlay member also includes a plurality of openings corresponding to the designated regions that are displayed on the top surface of the base member.

The overlay member has a thickness that extends between the opposite facing top and bottom surfaces, and the plurality of openings of the overlay member extend entirely through the thickness of the overlay member. The openings of the overlay member include side walls extending vertically from the bottom surface to the top surface of the overlay member. The designated regions displayed on the top surface of the base member are in the approximate shape of a section of the exterior body of a motor vehicle. The openings of the overlay member are also in the approximate shape of the corresponding designated regions of the base member. The overlay member is positioned on the top surface of the base member and the openings of the overlay member are superimposed substantially over the corresponding designated regions member of the base member. When the overlay member is superimposed over the base member the side walls of the openings of the overlay member and the top surface of designated region of the base member together form a compartment or well for locating and holding loose parts.

According to certain embodiments, the bottom surface of the overlay member is in direct adjacent contact with the top surface of the underlying base member. The overlay member can simply be positioned over the base a member such that the openings of the overlay member are superimposed over the corresponding designated regions of the base member. According to other illustrative embodiments, the overlay member may be attached or otherwise connected to the underlying base member. According to other embodiments, the overlay member may be connected to the underlying base member with a mechanical connector. According to certain embodiments, the mechanical connector for connecting the overlay member the underlying base member comprises one or more hinges.

The designated regions of the base member of the system include means for distinguishing one designated region from another designated region. The designated regions displayed on the base member are represented by different visually perceptible identifiers. According to certain illustrative embodiments, the different visually perceptible identifiers comprises different colors.

The system further comprises at least one separate elongated support member that is configured to carry one or more separate parts carriers. The system further includes least one separate parts carrier configured to carry parts that have been removed from the motor vehicle during the collision repair process and also to engage the elongated support. According to certain embodiments, the parts carriers comprise flexible bag members. The flexible bag members display a second visually perceptible identifier. The second visually perceptible identifier displayed on the flexible bag member is the same color as the color comprising first visually perceptible identifier displayed on the corresponding designated region of the base member.

Disclosed is a system and method for managing and organizing a plurality of parts during the disassembly/assembly process of an item, such as a motor vehicle. More specifically, the disclosure relates to a parts management system in which parts that are disassembled from a motor vehicle are placed on one or more marked portions of the system that correspond to the one or more sections of the motor vehicle from which the part was removed. Also disclosed is a system and method for managing and organizing a plurality of parts during the disassembly/assembly process of an item in which replacement parts are needed.

According to certain embodiments, the system includes a base member that comprises a substantially rigid and planar sub-base member having opposite facing top and bottom surfaces, a flexible sheet layer in adjacent contact with the top surface of the sub-base member and carried by sub-base member. The flexible sheet layer comprises opposite facing first and second surfaces, and the first surface of the flexible layer displays a plurality of designated regions corresponding to different sections of the exterior body of a motor vehicle. The overlay member is configured to be positioned over the top surface of the flexible layer member such that the openings of the overlay member are superimposed directly over the designated regions displayed on the top surface of the flexible layer member.

Without limitation, and only by way of illustration, the base member and the overlay member of the system may be formed from a thermoplastic material, such as, polyethylene, polypropylene, acrylonitrile butadiene styrene (ABS), polyvinyl chloride (PVC) and/or nylon. These two members may be manufactured by a suitable molding process, such as injection molding, blow molding, or rotational molding. The system may also be manufactured using other suitable materials such as plywood, wood, tile, plastic, laminate, metal, glass, and/or any other suitable material known in the art capable of forming a rigid layer member.

The marked designated regions displayed on the top surface of the base member may be marked by color, letter, number, texture, and/or any other symbol that identifies any marked designated region as different from other marked designated regions of the base member of the system. In one embodiment, the marked portions of the first layer are different colors. The marked regions may be arranged to form the general shape of a motor vehicle, wherein each marked region is representative of a different section of the motor vehicle. According to some embodiments, the base member may be a surface comprising a drawing of a motor vehicle, and the drawing may then be divided into different marked portions.

The overlay member may be attached to at least a portion of the base portion. The overlay member may be hingedly attached to the base member by way of a box hinge, butt hinge, H hinge, HL hinge, bi-fold hinge, concealed hinge, continuous hinge, piano hinge, off-set hinge, or any other hinge known in the art.

An illustrative vehicle collision repair process using the parts system will now be described. A motor vehicle having collision damage brought to a collision repair facility. The damaged motor vehicle may be introduced into repair cell from the outside environment for repair. A motor vehicle requiring collision damage repair undergoes a damage assessment or pre-operative planning stage to determine the extent of the damage to the vehicle and to set an overall collision repair plan for the damaged vehicle. During the process of assessing and identifying the collision damage of the vehicle, is may be necessary to disassemble certain hardware and/or parts from the damaged vehicle. The disassembled components may be placed in designated regions on the repair system in order to maintain organization and avoid misplacing the components.

The disassembled components are organized into compartments on the system that visually correspond to the section of the motor vehicle from which the part was removed. During reassembly, parts can be easily identified according the disclosed system. The disclosed system and method enable the parts from a disassembled item, e.g., a portion of motor vehicle, to be organized in a way that another individual or individuals who may be reassembling the item knows what parts go where and in what order the item is to be reassembled.

In an exemplary scenario, a mechanic may remove a door panel to replace a malfunctioning component. Removal of the door panel entails the disassembly of a plurality of parts. These parts can include smaller parts, such as fasteners and associated components. The mechanic may place the disassembled parts from the door panel in the marked portion of the first layer of the disclosed system that corresponds to the door panel section of the motor vehicle. If replacement parts are needed, the mechanic may place the old parts in a carrier and mark the carrier with an identifier corresponding to a certain marked portion on the first layer of the disclosed system.

The presently disclosed system and method are readily understood when read in conjunction with illustrative FIGS. 1 to 6. It should be noted that the system and method is not limited to any of the embodiments shown in the drawing figures, but rather should be construed in breadth and scope in accordance with the disclosure provided herein.

FIG. 1 shows vehicle service or collision repair system 10. System 10 includes a base member 20. Base member 20 is shown as a substantially flat or planar base member. Base member 20 includes opposite facing first 22 and second (not shown) major surfaces. According to certain embodiments, base member 20 is comprised of a substantially planar and rigid board member. Base member 20 displays a plurality of designated regions 30 that correspond to section of the exterior body of a motor vehicle. A top plan view shows a first subset of designated regions of a section of a motor vehicle including designated regions corresponding to the front bumper 31, hood 32, roof 33 of passenger cabin, trunk 34 and rear bumper 35. A top plan view of the driver's side of the motor vehicle shows a second subset of designated regions of a section of a motor vehicle including designated regions corresponding to the front bumper 41, driver's side front side panel 42, driver's side front door 43, driver's side rear door 44, driver's side read panel 45 and rear bumper 46. A top plan view of the passenger side of the motor vehicle shows a third subset of designated regions of a section of a motor vehicle including designated regions corresponding to the front bumper 51, passenger side front side panel 52, passenger side front door 53, passenger side rear door 54, passenger side read panel 55 and rear bumper 56. The various designated regions 31-35 of first subset, 41-46 of second subset, and 51-56 of third subset are identified by different colors.

Still referring to FIG. 1, system 10 includes an overlay member 60. Overlay member 60 is shown as a substantially flat or planar member. Overlay member 60 includes opposite facing first 62 and second (not shown) major surfaces and a thickness 66 extending between first 62 and second 64 surfaces. According to certain embodiments, overlay member 60 is comprised of a substantially planar and rigid board member. Overlay member 60 is hingedly attached along one of its edges to an edge of base member 20 at least one hinge 70. Overlay member 60 includes a plurality of openings 31a-35a, 41a-46a and 51a-56a that extend entirely though the thickness 66. Openings 31A-35A, 41A-46A and 51A-56A of overlay member 60 correspond to a specific designated region 31-35, 41-46, or 51-56 that are displayed on the top surface 22 of base member 20.

Figure 2:
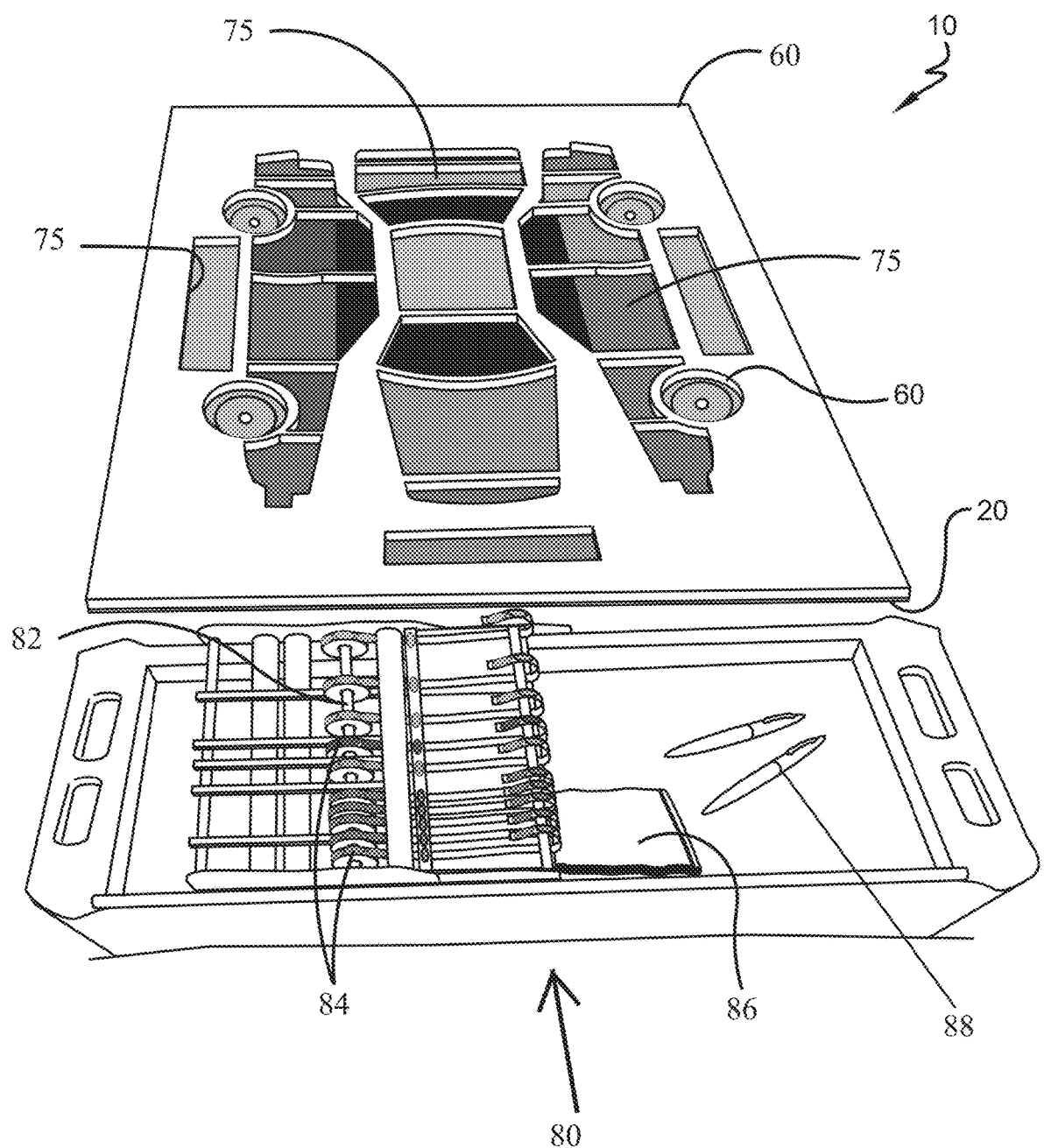
FIG. 2 is a top perspective view of the vehicle repair or service system of FIG. 1. Also shown is a station comprising rolls of illustrative identifiers (for example, different colored stickers) which correspond to different designated regions displayed on the base member of the system and parts carriers (for example, flexible plastic bags) for holding disassembled parts (for example, nuts, bolts, etc. . . . ) that need to be reassembled or reinstalled onto a motor vehicle being repaired or serviced.

FIG. 2 is a top plan view of the system 10 wherein the hinges (not shown) are in the closed position and the overlay member 60 is positioned on the top surface (not shown) of base member 20. When the hinges are in the closed position, second surface (not shown) of overlay member 60 may be in adjacent contact with top surface of base member 20 and openings 31a-35a, 41a-46a and 51a-56a (as shown in FIG. 1) are superimposed over designated regions 31-35, 41-46 and 51-56 (as shown in FIG. 1) of base member 20. The combination of the top surface of base member 20 in the areas of the designated regions 31-35, 41-46 and 51-56 (as shown in FIG. 1) and the side walls of each of the plurality of openings 31a-35a, 41a-46a and 51a-56a (as shown in FIG. 1) form compartments or wells 75 to hold parts or hardware that have been removed from corresponding sections of a motor vehicle undergoing collision repair or other servicing.

Still referring to FIG. 2, according to other embodiments, the system 10 includes station 80. Station 80 is shown as a tray for holding rolls 82 of different visually perceptible identifiers 84 which correspond to different designated regions 31-35, 41-46 and 51-56 (as shown in FIG. 1) of base member 20 of the system 10. Station 80 also holds a plurality of parts carriers in the form of flexible plastic bags 86 for holding disassembled parts (nuts, bolts, etc. . . . ) that need to be organized and subsequently reassembled or reinstalled on the motor vehicle. Station 80 also holds marking implements 88 for marking flexible bags 86 with parts numbers or other information or notes relating to the motor vehicle and/or the specific collision repair or service process(es) being conducted on the motor vehicle.

Figure 3:
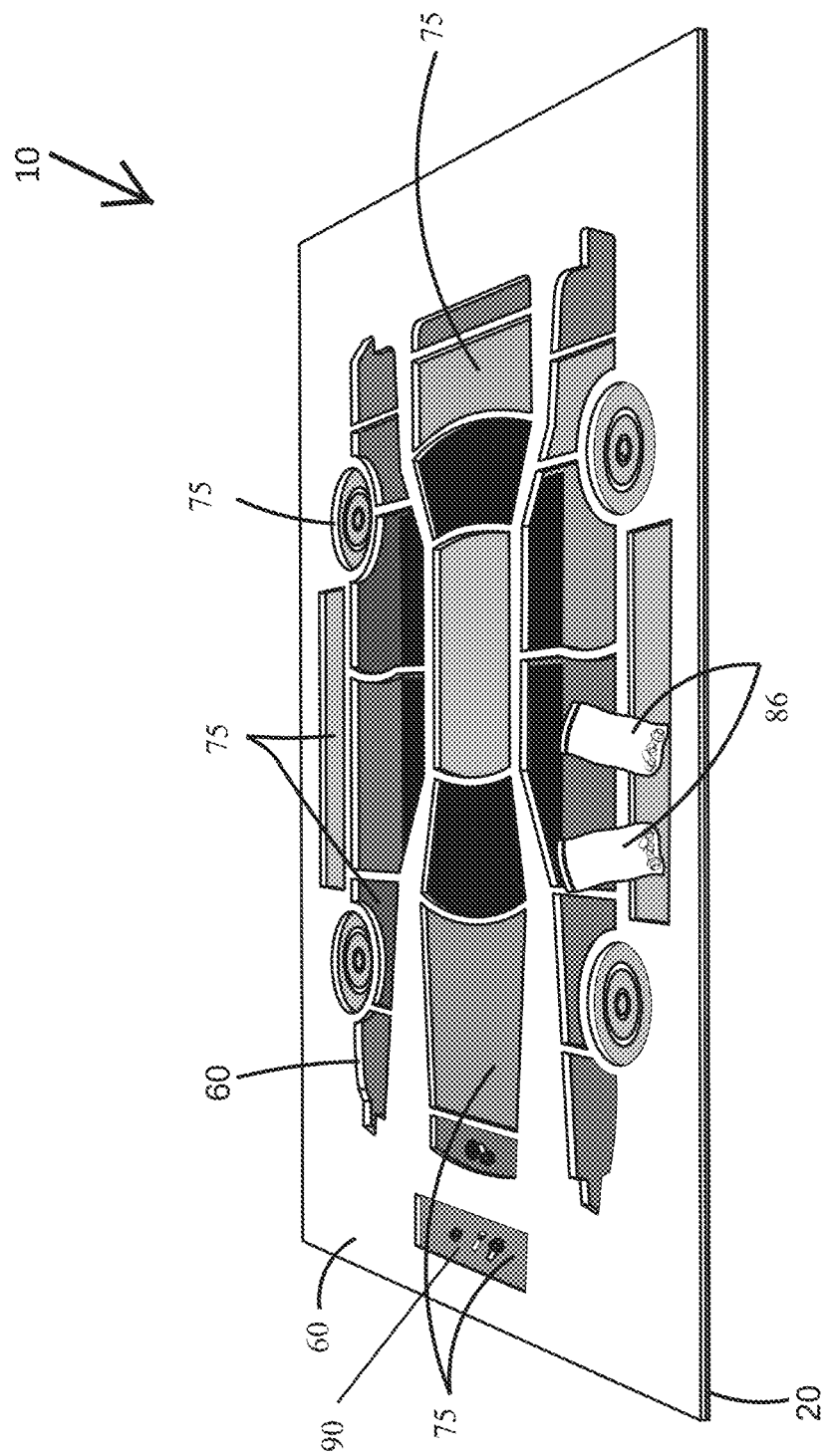
FIG. 3 is a side perspective view of the illustrative embodiment of the system of FIG. 1. A plurality of parts (for example, nuts, bolts, etc. . . . ) have been removed or disassembled from a motor vehicle and have been placed in designated regions created by the base member and the overlay member of the system.

FIG. 3 shows a perspective view of system 10 with the hinges (not shown) in the closed position and the overlay member 60 is positioned on the top surface (not shown) of base member 20 in use during a vehicle collision repair or service process. Designated areas 31-35, 41-46 and 51-56 (as shown in FIG. 1) displayed on the top surface of base member 20, together with superimposed opening 31a-35a, 41-a-46a and 51a-56a (as shown in FIG. 1) of overlay member 60, formed compartments or wells 75, respectively. Loose disassembled parts 90 from a motor vehicle are shown as being located in compartments 75. FIG. 3 also shows a plurality of disassembled parts that have been transferred from one of the compartments to parts carriers 86. It should be noted that note every collision repair process or service process carried out on a given motor vehicle results in the removal of hardware or parts from every section of the vehicle.

Figure 4:
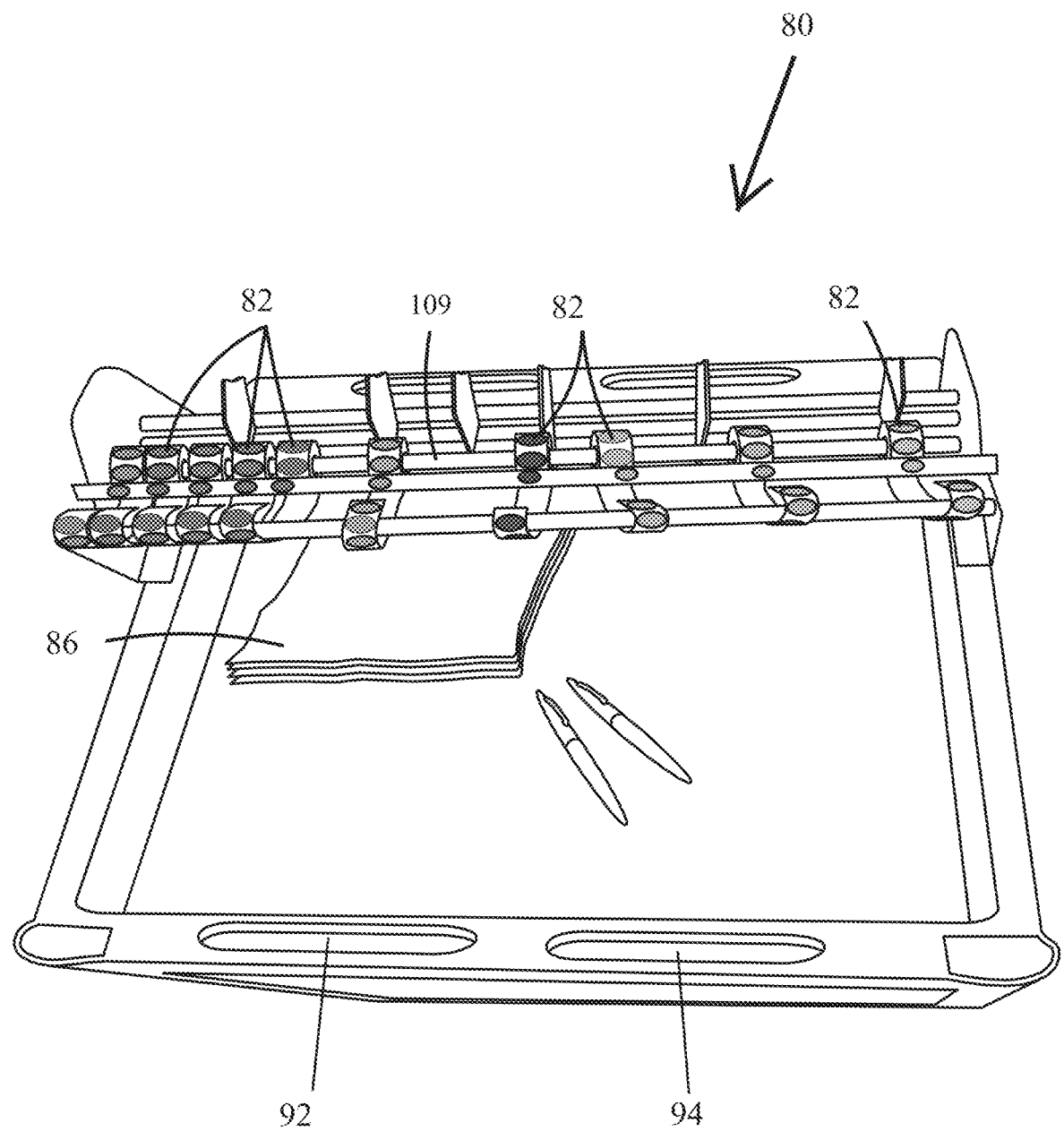
FIG. 4 is a perspective view of a station comprising rolls of identifiers (for example, different colored stickers) which correspond to different designated regions displayed on the base member of the system, removed parts carriers (for example, flexible plastic bags) for holding disassembled parts (for example, nuts, bolts, etc. . . . ), and a plurality of marking implements for marking the flexible parts carriers.

FIG. 4 is a top perspective view of station 80. Station 80 includes openings 92, 94. Openings 92, 94 serve as a handle for carrier station 80 throughout the vehicle repair cell or facility. Carrier rods 109 carry one or more rolls 82 of visually perceptible identifiers. As shown in FIG. 3, carrier rods 109 carry a plurality of rolls 82 of adhesive stickers of different colors. These different colors correspond to the color of the designated regions displayed on base member. Station includes a plurality of flexible bag parts carriers 86.

Figure 5:
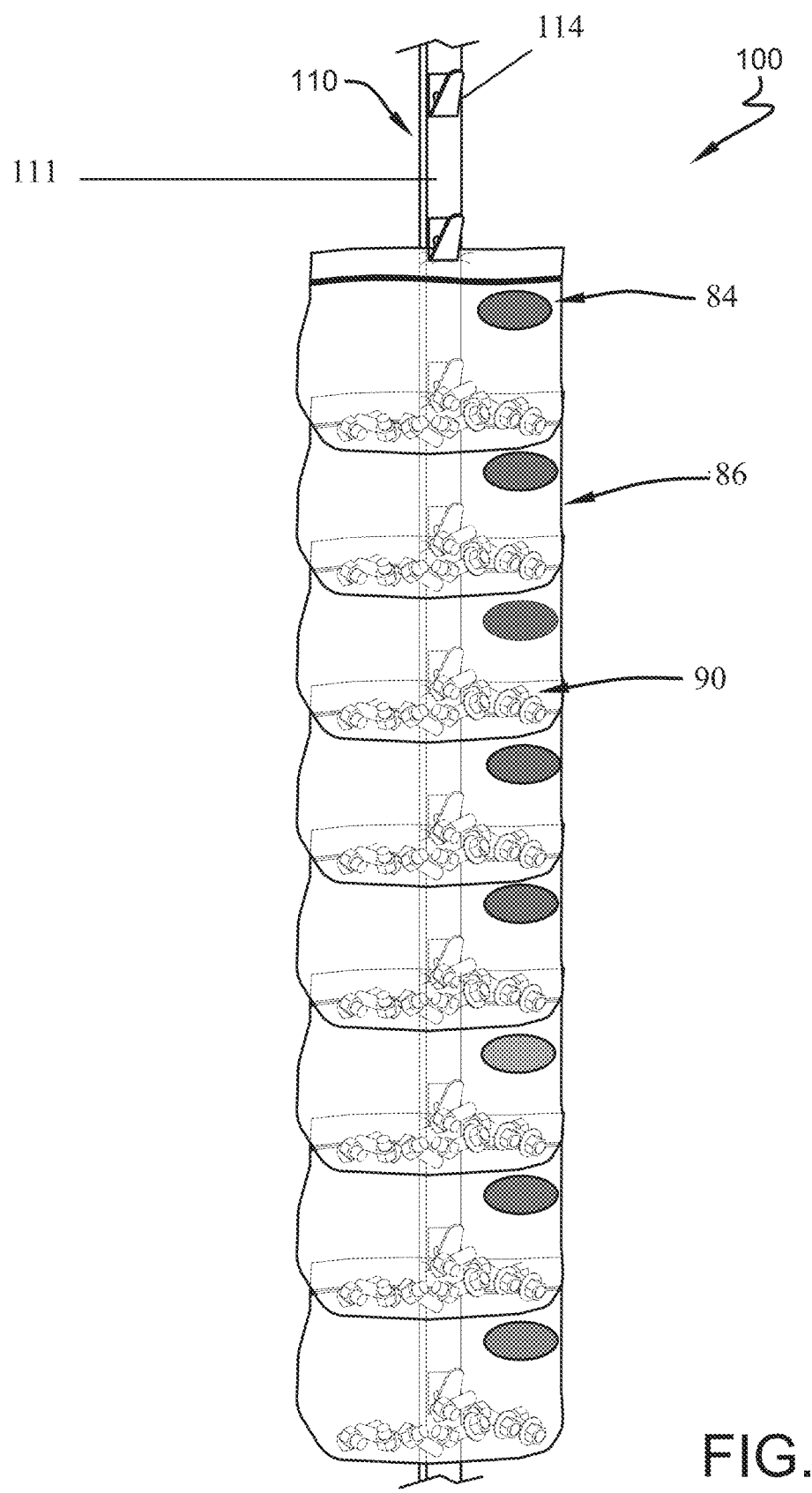
FIG. 5 is a front view of an illustrative embodiment of the elongated support member of the system in the form of a hanging clip system for placing bags containing disassembled parts (nuts, bolts, etc.) that need to be replaced, wherein the bags are identified by different identifiers (different colored stickers) which correspond to certain marked portions on the top layer of the base member of the system.

FIG. 5 is a front view of the elongated support 110 of the system 100 for carrying one or more parts carriers 86 (e.g., flexible bags). The elongated support 110 includes opposite facing front 111 and back (not shown) surfaces. Spaced apart tabs 114 are attached to the front surface 111 along the entire length of the elongated support 110. Loose parts 90 that have been removed from various sections of a motor vehicle have been placed in flexible bags 86. Each of the flexible bags 86 are marked with an identifier 84 corresponding to a designated compartment 75 of system 10, and which compartments correspond to the section of the motor vehicle from which the parts were removed.

Figure 6:
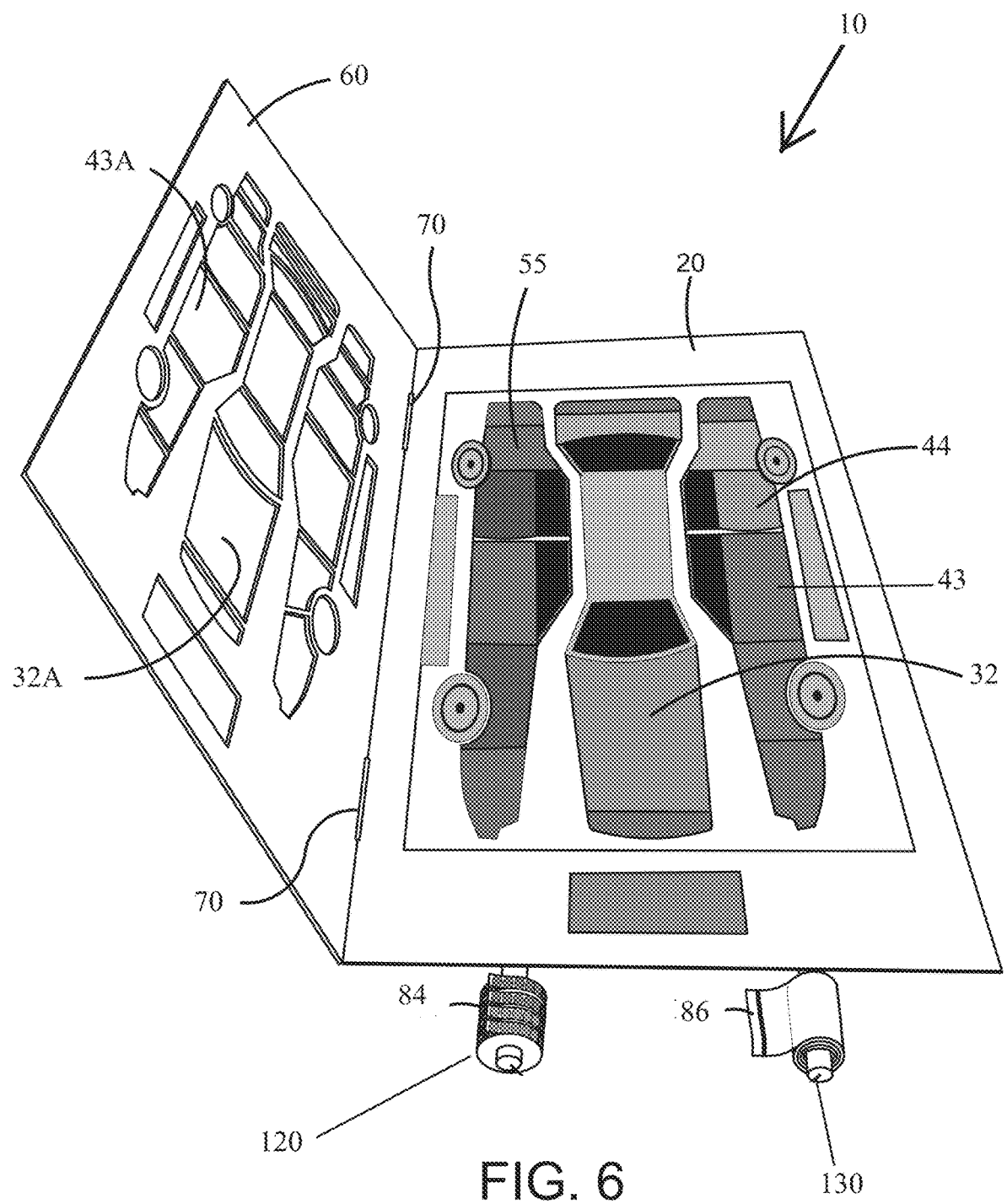
FIG. 6 is a top perspective view of the system in the open position. Two spaced-apart rails extend away from the base member and carry a plurality of parts carriers and visually perceptible identifiers.

FIG. 6 shows another embodiment of the system 10 shown in FIG. 1. According to the embodiment shown in FIG. 6, spaced apart rails 120, 130 extend from below an edge of base member 20. Rail 120 carries a roll 82 of identifiers 84 which correspond to designated areas of base member 20 of the system 10. Rail 130 carries a plurality of flexible bag parts carriers 86. Overlay member 60 is hingedly attached along one of its edges to an edge of base member 20 at least one hinge 70. A top plan view shows a first subset of designated regions of a section of a motor vehicle including designated regions corresponding to, in part, the hood 32. A top plan view of the driver's side of the motor vehicle shows a second subset of designated regions of a section of a motor vehicle including designated regions corresponding to, in part, the driver's side rear door 44. A top plan view of the passenger side of the motor vehicle shows a third subset of designated regions of a section of a motor vehicle including designated regions corresponding to, in part, the passenger side read panel 55. Opening 32A of overlay member 60 correspond to a region 32 that is displayed on the top surface of base member 20. Opening 43A of overlay member 60 correspond to a region 43 that is displayed on the top surface of base member 20.

The disclosed system and method allow multiple mechanics with varying degrees of ability who may be present during different work shifts, to disassemble and reassemble a vehicle or portion of a vehicle with increased efficiency. Increased efficiency of disassembly, repair, and reassembly can decrease the amount of time that elapses between the beginning and end of an automotive repair, thereby decreasing cost for automotive repairs. Furthermore, improved organization of parts can lead to a decrease in misplaced parts and/or a decrease in mistakes made during automotive servicing.

While the system and method described herein is utilized in connection with automotive servicing, it will become readily apparent that the system and method may be implemented in a variety of environments in which an item having multiple parts is to be disassembled and later reassembled.

While the system and method for managing or organizing a plurality of parts during the disassembly/assembly process of an item has been described above in connection with certain illustrative embodiments, it is to be understood that other embodiments may be used or modifications and additions may be made to the described embodiments for performing the same function without deviating therefrom. Furthermore, all embodiments disclosed are not necessarily in the alternative, as various embodiments may be combined to provide the desired characteristics. Variations can be made by one having ordinary skill in the art without departing from the spirit and scope hereof. Therefore, the system and method should not be limited to any single embodiment, but rather construed in breadth and scope in accordance with the recitation of the attached claims.

The invention claimed is:

1. A system for managing and organizing a plurality of parts comprising:
   a base member comprising opposite facing top and bottom surfaces and a plurality of regions corresponding to different sections of the body of a motor vehicle displayed on said top surface of said base member;
   an overlay member comprising opposite facing top and bottom surfaces and a plurality of open regions corresponding to said plurality of regions of said base member, wherein at least one of said plurality of regions of said base member is in the approximate shape of a section of said body of said motor vehicle, and wherein said at least one of said open regions of said overlay member is in the approximate shape of corresponding said plurality of regions of said base member;
   wherein the overlay member has a thickness extending between said opposite facing top and bottom surfaces, and wherein said plurality of open regions of said overlay member extend entirely through said thickness;
   wherein said plurality of open regions of said overlay member comprise sides walls extending vertically from said bottom surface to said top surface of said overlay member;
   wherein said overlay member is positioned on the top surface of said base member and said open regions of said overlay member are superimposed substantially over said corresponding plurality of regions of said base member;
   wherein at least a portion of said plurality of regions displayed on said base member are represented by first different visually perceptible identifiers;
   wherein said first different visually perceptible identifiers comprise a color;
   wherein said system further comprises a separate elongated support member;
   wherein said system further comprises at least one separate parts carrier configured to engage said support;
   wherein said at least one parts carrier comprises a plurality of flexible bag members; and
   wherein said flexible bag members display a second visually perceptible identifier.

2. The system of claim 1, wherein said second visually perceptible identifier displayed on said flexible bag member is the same color as the color comprising said first visually perceptible identifier displayed on said corresponding base member region.

3. The system of claim 1, wherein said side walls of said open regions of said overlay member and said top surface of said base member together form a compartment for locating loose parts.

4. The system of claim 3, wherein said bottom surface of said overlay member is in adjacent contact with said top surface of said underlying base member.

5. The system of claim 4, wherein said overlay member is hingedly attached to said base member.

6. A system for managing and organizing a plurality of parts comprising:
   a base member comprising opposite facing top and bottom surfaces and a plurality of regions corresponding to different sections of the body of a motor vehicle displayed on said top surface of said base member;
   an overlay member comprising opposite facing top and bottom surfaces and a plurality of open regions corresponding to the plurality of regions of said base member, wherein at least one of said plurality of regions of said base member is in the approximate shape of a section of said body of said motor vehicle, and wherein said at least one of said open regions of said overlay member is in the approximate shape of said corresponding plurality of regions of said base member;
   wherein the overlay member has a thickness extending between said opposite facing top and bottom surfaces, and wherein said plurality of open regions of said overlay member extend entirely through said thickness;
   wherein said plurality of open regions of said overlay member comprise sides walls extending vertically from said bottom surface to said top surface of said overlay member;
   wherein said overlay member is positioned on the top surface of said base member and said open regions of said overlay member are superimposed substantially over said corresponding plurality of regions of said base member; and
   wherein said base member comprises a substantially rigid and planar sub-base member having opposite facing top and bottom surfaces and a flexible sheet layer in adjacent contact with said top surface of said sub-base member and carried by said sub-base member, wherein said flexible sheet layer comprises opposite facing first and second surfaces, and wherein said first surface displays said plurality of regions corresponding to different sections of said body of said motor vehicle.

7. The system of claim 6, wherein said side walls of said opening regions of said overlay member and said top surface of said base member together form a compartment for locating loose parts.

8. The system of claim 7, wherein said bottom surface of said overlay member is in adjacent contact with said top surface of said underlying base member.

9. The system of claim 8, wherein said overlay member is hingedly attached to said base member.

10. The system of claim 6, wherein at least a portion of said regions displayed on said base member are represented by a first different visually perceptible identifiers.

11. The system of claim 10, wherein each of said first different visually perceptible identifiers comprise a color.

12. The system of claim 11, further comprising a separate elongated support member.

13. The system of claim 12, further comprising at least one separate parts carrier configured to engage said support.

14. The system of claim 13, wherein said at least one parts carrier comprises a plurality of flexible bag members.

15. The system of claim 11, further comprising flexible bag members displaying a second visually perceptible identifier.

16. The system of claim 15, wherein said second visually perceptible identifier displayed on said flexible bag member is the same color as the color comprising said first visually perceptible identifier displayed on said corresponding base member region.

17. A kit for managing and organizing a plurality of parts removed from a motor vehicle comprising:
- a base member comprising opposite facing top and bottom surfaces and a plurality of regions corresponding to different sections of the body of a motor vehicle displayed on said top surface of said base member;
- an overlay member comprising opposite facing top and bottom surfaces and a plurality of open regions corresponding to the plurality of regions of said base member;
- an elongated support member; and
- a plurality of parts carriers configured to hold loose parts and to engage said support.

18. A method of repairing collision damage or servicing a motor vehicle comprising:
   (i) removing parts from said motor vehicle; and
   (ii) placing said removed parts in one or more compartments of a system which correspond to a section of the motor vehicle from which the part was removed, wherein said system comprises (a) a base member comprising opposite facing top and bottom surfaces and a plurality of regions corresponding to different sections of the body of a motor vehicle displayed on said top surface of said base member, and (b) an overlay member comprising opposite facing top and bottom surfaces and a plurality of open regions corresponding to the plurality of regions of said base member,
   wherein at least one of said plurality of regions of said base member is in the approximate shape of a section of said body of said motor vehicle, and wherein said at least one of said open regions of said overlay member is in the approximate shape of corresponding plurality of regions of said base member;
   wherein the overlay member has a thickness extending between said opposite facing top and bottom surfaces, and wherein said plurality of open regions of said overlay member extend entirely through said thickness;
   wherein said plurality of open regions of said overlay member comprise sides walls extending vertically from said bottom surface to said top surface of said overlay member;
   wherein said overlay member is positioned on said top surface of said base member and said open regions of said overlay member are superimposed substantially over said corresponding plurality of regions of said base member to form said one or more compartments;
   wherein at least a portion of said plurality of regions displayed on said base member are represented by first different visually perceptible identifiers;
   wherein said first different visually perceptible identifiers comprise a color;
   wherein said system further comprises an elongated support member;
   wherein said system further comprises at least one parts carrier configured to engage said support;
   wherein said at least one parts carrier comprises a plurality of flexible bag members; and
   wherein said flexible bag members display a second visually perceptible identifier;
   (iii) transferring said removed parts from said compartments to parts carriers corresponding to said compartments;
   (iv) performing at least one collision repair or service task on said motor vehicle; and
   (v) said reinstalling said removed parts to said section of said motor vehicle from which they were removed.

19. The method of claim 18, comprising assessing said collision damage of said motor vehicle to be repaired prior to said step of removing parts from said motor vehicle.

20. The method of claim 19, comprising introducing said motor vehicle having collision damage into a repair cell prior to assessing said collision damage of said motor vehicle to be repaired.

21. The method according to claim 18, further comprising cleaning the parts before placing the parts in one or more said compartments.

22. The method according to claim 18, further comprising placing an identifier on one or more carriers.

23. The method according to claim 18, wherein each marked parts carrier is marked with a different color.

* * * * *